United States Patent [19]

Schack et al.

[11] 4,163,774

[45] Aug. 7, 1979

[54] $N_2F_3SBF_6$ AND ITS PREPARATION

[75] Inventors: Carl J. Schack, Chattsworth; Karl O. Christe, Calabasas, both of Calif.

[73] Assignee: The United States of America as represented by the Secretary of the Navy, Washington, D.C.

[21] Appl. No.: 964,025

[22] Filed: Nov. 27, 1978

[51] Int. Cl.$^2$ .............................................. C01B 21/18
[52] U.S. Cl. .................................... 423/351; 423/462; 149/119
[58] Field of Search ....................... 423/351, 462, 466; 149/19.3, 119

[56] References Cited

U.S. PATENT DOCUMENTS

| | | | |
|---|---|---|---|
| 3,980,509 | 9/1976 | Lubowitz et al. | 423/462 |
| 3,981,756 | 9/1976 | Gotzmer, Jr. | 423/462 |
| 4,001,136 | 1/1977 | Channell et al. | 252/187 |

OTHER PUBLICATIONS

Christe et al., Novel & Known NF$_4$+ Salts, Inorg. Chem., vol. 15, No. 6, 1976, pp. 1275-1282.
Christe et al., Synthesis & Characterization of NF$_4$BiF$_6$ and Properties of NF$_4$SbF$_6$, Inorg. Chem. vol. 16, No. 4, 1977, pp. 937-940.
Christe, Synthesis and Characterization of (NF$_4$)$_2$NiF$_6$, Inorg. Chem. Vol. 16, No. 9, 1977, pp. 2238-2241.

*Primary Examiner*—O. R. Vertiz
*Assistant Examiner*—Thomas W. Roy
*Attorney, Agent, or Firm*—R. S. Sciascia; W. Thom Skeer; L. E. K. Pohl

[57] ABSTRACT

$N_2F_4$ and $SbF_5$ react in anhydrous HF to produce $N_2F_3SbF_6$. The salt is useful as a burn rate modifier in $NF_3$-$F_2$ gas generators.

3 Claims, No Drawings

$N_2F_3SbF_6$ AND ITS PREPARATION

BACKGROUND OF THE INVENTION

1. Field of the Invention

This invention relates to the salt $N_2F_3SbF_6$ and to its preparation.

2. Description of the Prior Art

The use of solid compositions to produce fluorine and $NF_3$ for chemical lasers is known. For example, Pilipovich in U.S. Pat. No. 3,963,542, describes such a composition. The need for burn rate modifiers for solid gas generating compositions is also well known.

SUMMARY OF THE INVENTION

According to this invention, a salt that is useful as a burn rate modiifier for $NF_3$-$F_2$ gas generators is provided. The salt is a fluorine containing salt having the formula $N_2F_3SbF_6$ and is prepared by reacting $N_2F_4$ and $SbF_5$ in anhydrous HF. Insofar as is known by the inventors, $N_2F_3SbF_6$ has not been previously synthesized.

DESCRIPTION OF THE PREFERRED EMBODIMENT

The preparation of the salt of this invention is illustrated by the following example.

EXAMPLE

Synthesis of $N_2F_3SbF_6$. A Teflon ampule, containing a Teflon coated magnetic stirring bar and equipped with a stainless steel valve, was loaded with 14.4 mmol of $SbF_5$ in a glovebox. The ampule was then attached to a vacuum line and 2 ml of anhydrous HF was condensed into the ampule at $-78°$ C. while stirring and warming to ambient temperature. The system was then pressurized with $N_2F_4$ (1 atm). A gradual decrease in the pressure was noted due to uptake of $N_2F_4$. Periodic cycling to below $0°$ C. seemed to increase the rate of $N_2F_4$ uptake. After several hours the unreacted $N_2F_4$ and HF solvent were pumped off at $40°$ C. until constant weight was achieved. The observed weight gain corresponded to the reaction of 12.1 mmol of $N_2F_4$. When the reaction was repeated on a larger scale with 8 ml HF for 3 days, it was found that 74.0 mmol of $SbF_5$ reacted with 73.5 mmol of $N_2F_4$ to give 23.66 g of $N_2F_3SbF_6$ (weight calcd for 74.0 mmol of $N_2F_3SbF_6$ 23.74 g), which was characterized by $^{19}F$ NMR and vibrational spectroscopy.

Tests in which small amounts of $N_2F_3SbF_6$ were incorporated into aluminized $NF_3$-$F_2$ gas generator compositions showed that the salt was effective as a burn rate modifier.

What is claimed is:

1. The salt having the formula:

$N_2F_3SbF_6$.

2. A method for preparing the salt having the formula $N_2F_3SbF_6$ comprising the steps of:
    forming a solution of $N_2F_4$ and $SbF_5$ in anhydrous HF; and
    reacting the $N_2F_4$ and $SbF_5$ at room temperature.

3. A method according to claim 2 wherein the HF solvent is removed by distillation.